(12) United States Patent
Häfele

(10) Patent No.: US 6,229,093 B1
(45) Date of Patent: *May 8, 2001

(54) MINERAL-INSULATED ELECTRICAL CABLE

(75) Inventor: Edelbert Häfele, Karlsruhe (DE)

(73) Assignee: Heracus Electro-Nite International N.V., Houthalen (BE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,498

(22) Filed: Apr. 28, 1999

(30) Foreign Application Priority Data

Apr. 30, 1998 (DE) .............................. 198 19 283

(51) Int. Cl.$^7$ ..................................... H01B 7/28
(52) U.S. Cl. ............................. 174/122 G; 174/152 GM
(58) Field of Search ..................... 174/50.56, 75 B, 174/152 GM, 74 R, 77 R, 50.55, 50.61, 65 SS, 122 G, 124 G, 124 GC

(56) References Cited

U.S. PATENT DOCUMENTS

| | | | |
|---|---|---|---|
| 2,100,187 | * 11/1937 | Handrek | 174/152 GM X |
| 2,192,892 | * 3/1940 | Brandt | 174/152 GM X |
| 3,065,533 | * 11/1962 | Dungan et al. | 174/65 SS |
| 4,935,583 | * 6/1990 | Kyle | 174/152 GM |
| 5,917,150 | * 6/1999 | Hampton et al. | 174/50.56 |

FOREIGN PATENT DOCUMENTS

| | | |
|---|---|---|
| 27 17 765 A1 | 11/1977 | (DE) . |
| 195 09 132 A1 | 9/1996 | (DE) . |
| 1 270 100 | 4/1972 | (GB) . |

* cited by examiner

Primary Examiner—Dean A. Reichard
Assistant Examiner—Chau N. Nguyen
(74) Attorney, Agent, or Firm—Akin, Gump, Strauss, Hauer & Feld, L.L.P.

(57) ABSTRACT

A mineral-insulated electrical cable has a tubular casing and several metallic conductors running inside the tubular casing and projecting out of it, which are insulated against one another and against the tubular casing. The metal casing has on at least one end a gas-tight seal through which the conductors are passed, and each conductor projecting out of the seal has in connection with the seal and over a part of its length a sheath made of ceramics, glass and/or glass ceramics. In order to improve the resistance of the MI cable to corrosion, each sheath is constructed as a sleeve of the respective conductor with at least one liquid-tight layer in connection with the seal of the tubular casing.

14 Claims, 3 Drawing Sheets

MINERAL-INSULATED ELECTRICAL CABLE

BACKGROUND OF THE INVENTION

The invention relates to a mineral-insulated electrical cable having a tubular casing and several metal conductors running within the tubular casing and projecting from it, which are insulated against one another and against the tubular casing, wherein the tubular casing has a gas-tight seal on at least one end, through which the conductors are passed, and wherein the conductors projecting out of the seal, in the connection with the seal and over a portion of their length, each have a sheath of at least one material selected from the group of ceramics, glass, and glass ceramics.

A so-called MI (mineral-insulated) cable of this type is known from German published patent application DE 195 09 132 A1. They are used, for example, for purposes of measurement and regulation in the sensor technology area in motor vehicles and are there exposed to relatively high temperatures, for example in the exhaust gas system. The MI cable has a casing which is made of a metal tube. The conductors run in an insulation of a mineral powder. A gas-tight glass seal is arranged at the outlet opening for the conductors from the metal tube. A ceramic molded part is pushed over the conductors projecting out of the metal tube. With such cables, there are typically corrosion phenomena in the outlet area of the conductors from the metal casing or in the seal or even in the molded part. These corrosion phenomena are caused by condensate formation between the (current-bearing) conductors. It is known to use corrosion-resistant cables of titanium or tantalum. These materials have a high corrosion resistance, but a relatively poor ductility and mechanical stability at high thermal alternating stress. Since the conductors of an MI cable are frequently contacted by clamping action, they must have good elastic properties. This is only the case to a very limited extent with titanium and tantalum. Also, neither material is optimally suited for a welding connection with further contact materials, for example on a sensor chip. The similarly used high grade steel cables do not, to be sure, have these disadvantages and are in addition very easily manufacturable, but are nonetheless very susceptible to corrosion with current flow.

An electrical cable having a tubular casing and several conductors running within the tubular casing and projecting out of them is known from German published patent application DE 27 17 765 A1. The conductors are insulated against each other and against the metal tubular casing by an insulation sleeve. The tubular casing is joined at one end with a connection element, wherein the juncture is closed off gas-tight with a seal. The so-described connection element serves for liquid-tight installation, for example of underwater cables.

A similar electrical cable is known from British patent specification GB 1 270 100. This is constructed as a mineral-insulated cable, wherein the individual conductors have a conventional insulation sleeve. The insulation sleeves serve for corrosion protection and are made of plastic.

SUMMARY OF THE INVENTION

An object of the invention consists in that the known disadvantages of the MI cables of the prior art can be at least partially eliminated.

This objective is accomplished in accordance with the invention in that each sheath is constructed as a liquid-tight sleeve for the respective conductor, at least in the connection at the seal, and is constructed in at least one layer. This sheath lies firmly and tight against the conductors as a sleeve. The sealing layer above the sheath prevents condensate from penetrating through the sheath to the conductor. With the arrangement of the invention, the sheaths of the conductors are separated from each other with the sealing layers and form an open intermediate space arranged between them and between two adjacent conductors, in which the condensate accumulates. The condensate thus does not form between electrically conducting elements, so that an electrocorrosive effect cannot arise. By such a prevention of condensate formation between electrically conducting surfaces, it is possible to use stainless steels, for example, as conductors for the MI cable, since this negative effect, which high grade steels of this type manifest, is eliminated by the invention, while the aforementioned advantages of stainless steel conductors can be exploited. The manufacture of a thermally stable, liquid-tight and electrically insulating sheath is not realizable with all material combinations (sheath/electrical conductor/glass seal) by means of a single layer. Rather, it has become apparent that a two layer system with a first well-adhering porous layer and a second, sealing layer arranged over this permits an optimization of the mechanical and electrical properties while simultaneously increasing process certainty.

It is advantageous for the sheath to have a first layer which is porous and/or rough on at least its outer surface, and for a liquid-tight outer layer to be arranged on this surface, wherein the mean pore size of the sheath (or its first layer) and/or the mean roughness preferably amounts to at least 1 $\mu$m. The adhesion of the sealing layer on the sheath is thereby improved. The sealing layer is appropriately made of a glass. Glass can be softened by heating and thus penetrate into the pores or roughnesses and adhere there firmly. It is expedient for the sheath to have several first layers, wherein on the surface of at least one of these layers a liquid-tight outer layer is arranged.

Especially when using the MI cable in motor vehicle sensor technology, these cables are exposed to high temperatures, since they can, for example, serve directly in the exhaust gas system for contacting exhaust gas sensors, for example. When using low-melting glasses as a sealing layer, these glasses can be softened without anything more, since a flowing away is prevented owing to the roughness of the surface of the sheath lying under it. The sheath itself can, for example, be formed from aluminum oxide or spinel. Even a sheath made of a high-melting or a high temperature-softening glass is possible. The melting temperature or the softening point of the sheath material should preferably amount to at least 1500° C., while the sealing layer should have a melting temperature or a softening point in the range of about 900° C. to 1300° C.

The length of the sheath with the sealing layer is preferably greater than the capillary height to which the condensed water or otherwise forming condensate rises according to experience. This elevation can be calculated or determined by a few experiments for the specific boundary conditions.

A higher electrical conductivity of the sheath or the material of the sealing layer arising at higher temperatures is harmless, since no condensate occurs at high temperatures. This condensate formation is basically a problem of the starting phase of a motor, when the motor and the exhaust gas system are still cold, but the sensor arranged on the MI cable is already activated to monitor the exhaust gas stream, and hence a current is flowing through the conductors of the MI cable. At extreme operating conditions, in which the conductivity requirements are very high, it is expedient that the sealing layers of the individual conductors be separated from one another even at their base, and that the juncture of the surfaces of two conductors thus not only takes place through the sealing layer, but also through a third material arranged between the two sealing layers, namely the material of the gas-tight seal of the tubular casing.

With fewer high conductivity requirements the materials of the sealing layers of the individual conductors can also be joined with one another at the bases of the conductors, thus to the outlet areas from the seal. In this case, it is essential that the free length of the sheaths of the individual conductors with the sealing layer is greater than the capillary height to which the condensate rises.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
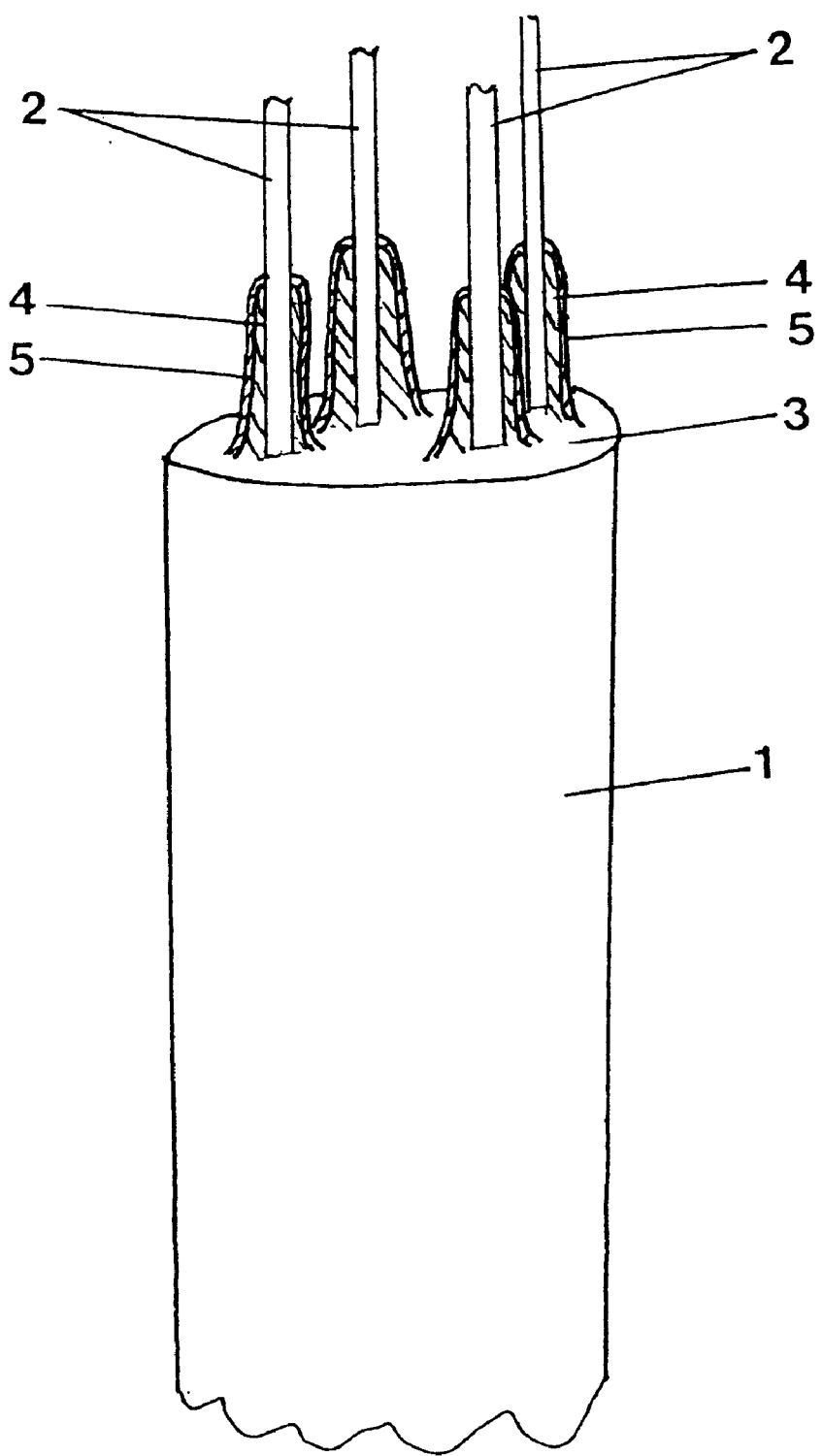
FIG. 1 is a schematic perspective view of an end of an MI cable with two layer sheaths (in sectional view) over the conductors.

The tubular casing 1 of the MI cable is made of steel. The conductors 2 are made of inconel and embedded within the tubular casing 1 in a powdery mineral insulation. The outlet area of the conductors 2 from the tubular casing 1 is sealed off gas-tight with a glass seal as seal 3. The conductors 2 have at their outlet ends from the tubular casing 1, in the embodiment depicted in FIG. 1, a sheath 4 as a sleeve with a first layer of porous $Al_2O_3$. The sheath 4 is enclosed on its outer surface by a glass, as is known, for example, from DE 195 09 132 A1, as an outer layer 5, so that a penetration by condensate into the first layer of the sheath 4 and further up to the conductor 2 is not possible.

Figure 2:
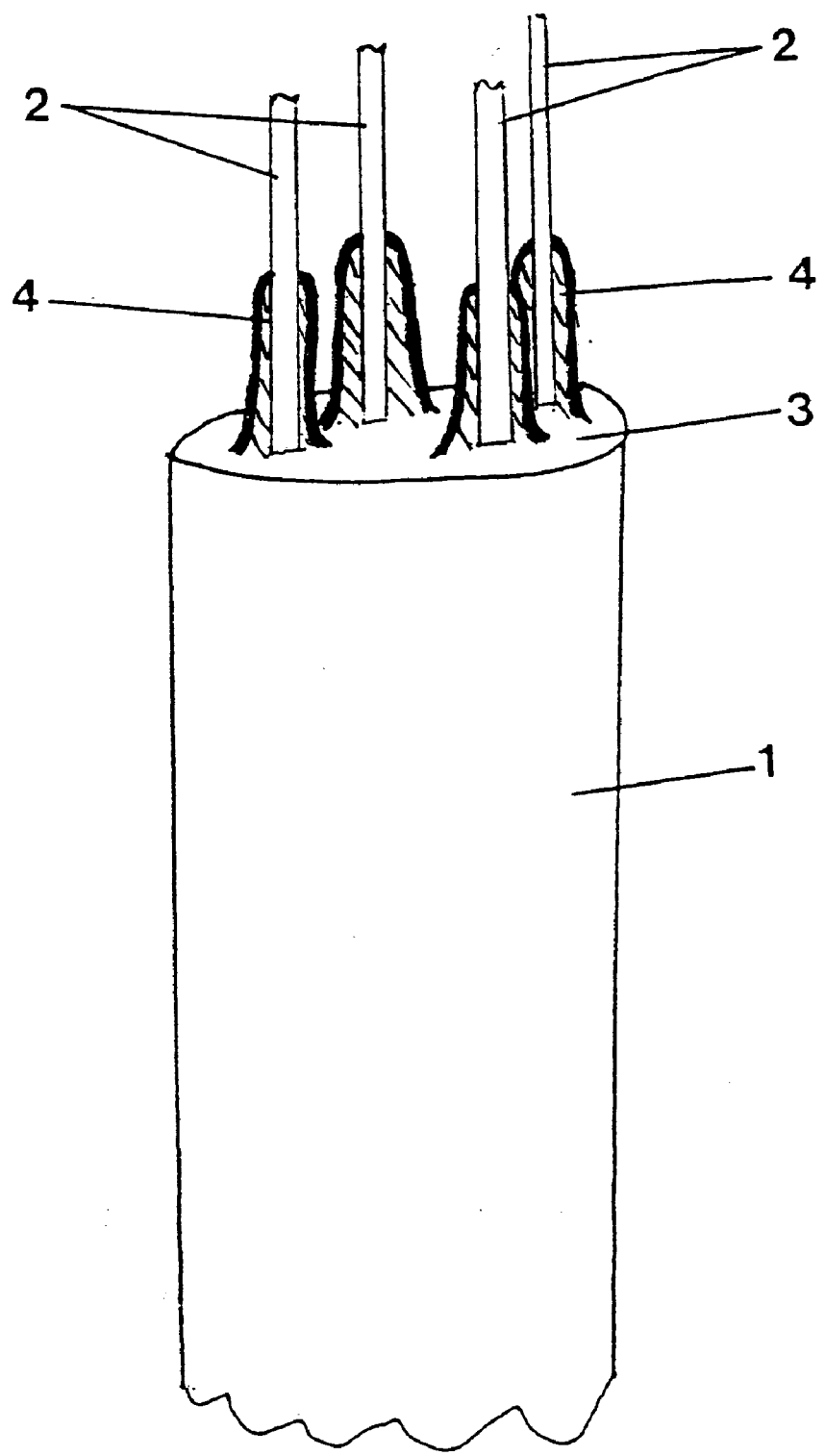
FIG. 2 is a schematic perspective view of an end of the MI cable with one layer sheaths (in sectional view) over the conductors.
Figure 3:
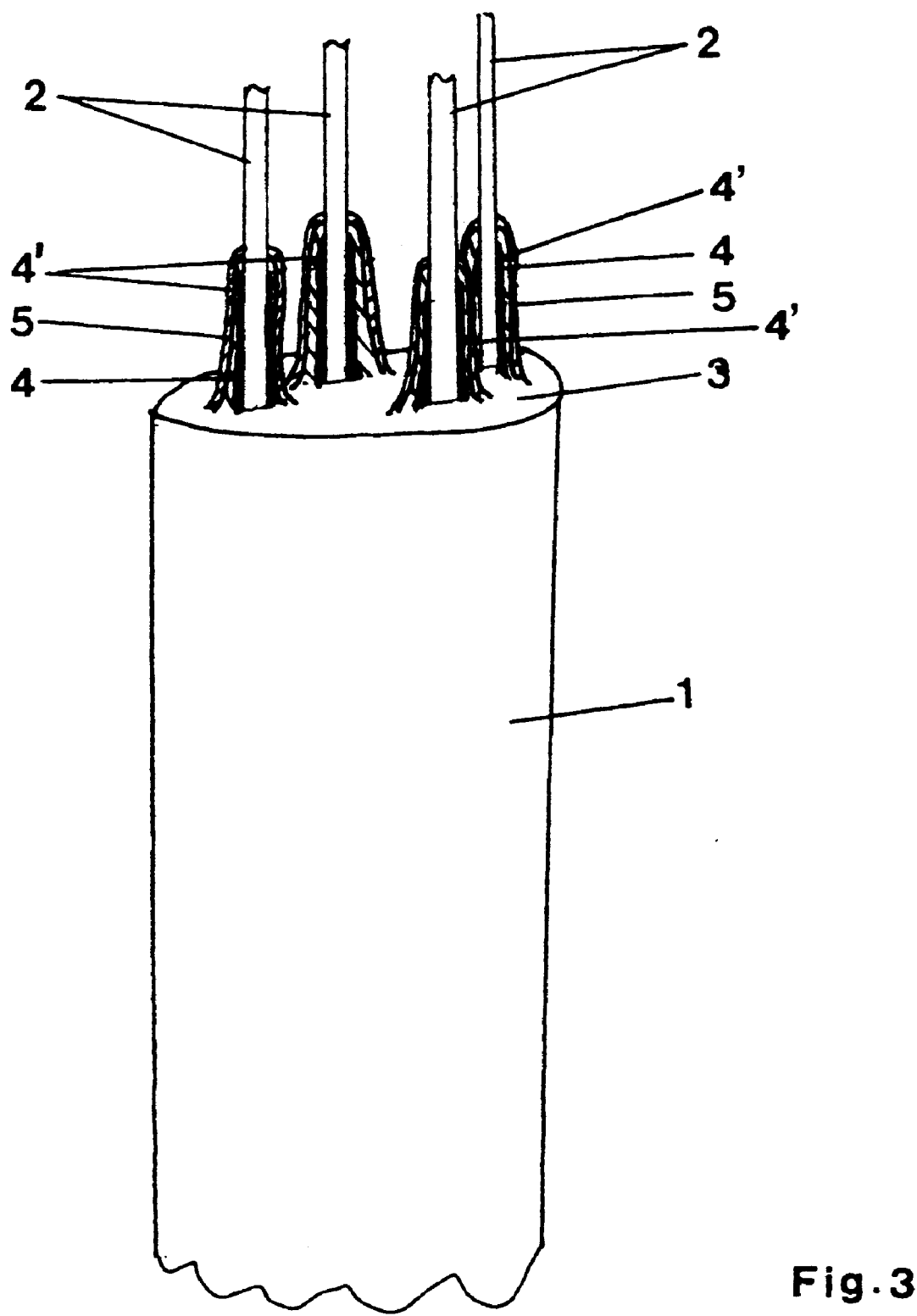
FIG. 3 is a schematic perspective view of an end of the MI cable with plural layer sheaths (in sectional view) over the conductors.

In the embodiment depicted in FIG. 2 the sheath 4 merely consists of one layer tight on its surface. Basically, a multi-layer construction (FIG. 3) is also possible, in which at least one of the layers 4; 4' (this can also be an intermediate layer) is liquid-tight. A combination of several sealing layers in combination is also possible.

The sheaths 4 of the individual conductors either merge into one another at their bases (at the gas-tight seal of the tubular casing) or they are separated from one another there.

The condensate, which has formed at the bases of the conductors 2 in the cold state of the motor or in the cold start phase, cannot creep up to the free surfaces of the conductors 2, so that no electrically conducting juncture between individual conductors 2 takes place via the condensate.

It will be appreciated by those skilled in the art that changes could be made to the embodiment(s) described above without departing from the broad inventive concept thereof It is understood, therefore, that this invention is not limited to the particular embodiment(s) disclosed, but it is intended to cover modifications within the spirit and scope of the present invention as defined by the appended claims.

I claim:

1. A mineral-insulated electrical cable, comprising a tubular casing and a plurality of metal conductors running within the tubular casing and projecting out of it, each conductor being insulated against each other and against the tubular casing, the tubular casing having a gas-tight seal on at least one end through which the conductors pass, each conductor projecting out of the seal having in connection with the seal and over a portion of the conductor's length a sheath made of at least one material selected from the group consisting of ceramics and glass, said sheath being constructed as a liquid-tight sleeve on the conductor at least in connection with the seal, the sheath comprising at least one first layer made of ceramic and a liquid-tight outer layer made of a glass, wherein the outer surface of the at least one first layer is at least one of porous and rough, and the glass of the outer layer lies on and penetrates the porous or rough outer surface.

2. The mineral-insulated electrical cable according to claim 1, wherein the outer surface has a mean pore size or a mean roughness which amounts to at least 1 $\mu$m.

3. The mineral-insulated electrical cable according to claim 1, wherein a length of the sheath with its liquid-tight outer layer is greater than a capillary height to which condensed water rises between the conductors.

4. The mineral-insulated electrical cable according to claim 1, wherein the liquid-tight outer layer of each of the conductors is separated from one another.

5. The mineral-insulated electrical cable according to claim 1, wherein the outer surface of the at least one first layer is completely enclosed by the liquid-tight outer layer.

6. The mineral-insulated electrical cable according to claim 1, wherein the at least one first layer comprises a plurality of layers.

7. A mineral-insulated electrical cable, comprising a tubular casing and a plurality of metal conductors running within the tubular casing and projecting out of it, each conductor being insulated against each other and against the tubular casing, the tubular casing having a gas-tight seal on at least one end through which the conductors pass, each conductor projecting out of the seal having in connection with the seal and over a portion of the conductor's length a sheath made of at least one material selected from the group consisting of ceramics and glass, said sheath being constructed as a liquid-tight sleeve on the conductor at least in connection with the seal, the sheath comprising at least one first layer having a melting point of at least 1500° C. and a liquid-tight outer layer having a softening point of 900° C. to 1300° C., wherein the outer surface of the at least one first layer is at least one of porous and rough, and the outer layer lies on and penetrates the porous or rough outer surface.

8. The mineral-insulated electrical cable according to claim 7, wherein the outer surface has a mean pore size or a mean roughness which amounts to at least 1 $\mu$m.

9. The mineral-insulated electrical cable according to claim 7, wherein a length of the sheath with its liquid-tight outer layer is greater than a capillary height to which condensed water rises between the conductors.

10. The mineral-insulated electrical cable according to claim 7, wherein the liquid-tight outer layer of each of the conductors is separated from one another.

11. The mineral-insulated electrical cable according to claim 7, wherein the outer surface of the at least one first layer is completely enclosed by the liquid-tight outer layer.

12. The mineral-insulated electrical cable according to claim 7, wherein the at least one first layer comprises a plurality of layers.

13. The mineral-insulated electrical cable according to claim 7, wherein the liquid-tight outer layer comprises a glass.

14. The mineral-insulated electrical cable according to claim 7, wherein the at least one first layer comprises ceramic.

\* \* \* \* \*